Patented May 14, 1940

2,200,926

UNITED STATES PATENT OFFICE 2,200,926

DIAZO DERIVATIVES OF CYCLIC GUANIDYL SULPHONIC ACIDS

Hans Z. Lecher, Plainfield, Frederic H. Adams, Somerville, and Henry Philip Orem, North Plainfield, N. J., assignors to American Cyanamid Company, New York, N. Y., a corporation of Maine No Drawing. Application December 23, 1939, Serial No. 310,821

10 Claims. (Cl. 260—140)

This invention relates to stabilized diazo compounds in which a diazotized polynuclear amine free from solubilizing groups is chemically combined with a cyclic guanidyl sulphonic acid free from azoic coupling groups. The diazo components used in the present invention will be referred to in the specification and claims as ice color diazo components because of their common use in this type of colors. Diazo compounds, diazotized amines and diazo components when referred to broadly will include compounds containing more than one diazo group or more than one amino group such as tetrazo compounds or diamines.

According to the present invention the diazotized polynuclear amines are condensed with cyclic guanidyl sulphonic acids or their alkali metal or ammonium salts in which the guanidyl group has at least one reactive hydrogen attached to a nitrogen atom and capable of reacting with a diazotized amine. The products obtained are of high stability and will not couple with ice color coupling components in alkaline medium although they may be split by acid into their original components. The products are thus useful in the printing of ice colors as they permit mixing with the coupling component in a stable alkaline printing paste without producing color and to develop the resulting print by treatment with a weak acid or acid vapors in the usual manner.

The new stabilized diazo compounds of the present invention correspond most probably to the following general formula: X—(N=N—G)$_n$ in which X is a radical of a polynuclear ice color diazo component, G is a radical of a cyclic guanidyl sulphonic acid or of its alkali metal or ammonium salt and $n$ is 1 or 2.

It is not certain just where the azo group connects with the guanidine radical and the present invention is not limited to any particular theory of the formula of the compound. The following typical formula is believed to be the most probable one, but it is possible that the azo group or the C=N double bond may be shifted to another nitrogen atom because of tautomerism:

such compounds as long as they contain a reactive hydrogen atom attached to a nitrogen atom and are capable of reacting with diazotized amines of the types referred to. Simple cyclic guanidyl sulphonic acids may be used such as guanidyl cyclohexane sulphonic acids, sulphobenzyl guanidines, guanidyl benzene sulphonic acids such as guanyl sulphanilic acid or guanyl metanilic acid or guanyl orthanilic acid, guanidyl naphthalene sulphonic acids such as guanyl naphthionic acid or guanyl Tobias acid. Also heterocyclic guanidyl sulphonic acids are useful, such as guanidyl benzothiazole sulphonic acids; as are disulphonic acids such as guanidyl benzene-2,5-disulphonic acid. The cyclic guanidyl sulphonic acids that also contain a carboxylic group are not claimed in this application as they constitute a part of the subject matter of and are claimed in the copending application Serial Number 310,819, filed December 23, 1939.

The guanidyl group itself may be substituted as, e. g., in diphenyl guanidine monosulphonic acid. The radicals substituting the guanidyl groups or connecting the guanidyl groups with the sulphonic groups may be further substituted, provided that the substituent does not make the radical capable of azoic coupling as hydroxyl or amino groups would do with an aromatic radical: thus 2-chloro-5-guanidyl toluene-4-sulfonic acid may be used as stabilizer.

It is an advantage of the present invention that the new stabilized diazo compounds can be produced with practically all polynuclear ice color diazo components including the compounds having the ring systems condensed and those in which the ring systems are not condensed with each other. Typical polynuclear amines which may be diazotized or tetrazotized and reacted with cyclic guanidyl sulphonic acids are the following: amino biphenyls such as xenylamine, benzidine, o-tolidine, o-anisidine, 3,3'-dichlorobenzidine. Alpha and beta naphthylamine, 1,5 diamino naphthalene, 2-methoxy-1-naphthyl amine. Alpha amino anthraquinone. 2-amino-3-nitrofluorene and 2-amino-3-nitrofluorenone. Amino carbazoles such as 2-amino carbazole, 3,6

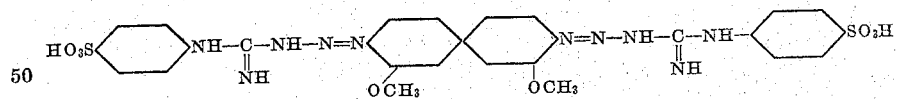

The present invention is not limited to the use of any particular cyclic guanidyl sulphonic acid. On the contrary, it is generally applicable to any diamino carbazole, 2-nitro-3-amino carzazole. 2-nitro-3-amino dibenzofuran, 2-amino-3-nitro benzothiophene, 1-amino-5-fluorobenzothiazole.

4,4'-diamino stilbene. Amino diarylamines and their ether derivatives and their nitro derivatives such as, e. g., 2-methoxy-5-amino diphenylamine, 4-methoxy-4'-amino diphenylamine, 4-ethoxy-4'-amino diphenylamine, 3,4'-dinitro-4-amino diphenylamine, 4,4'-diamino diphenylamine, 2,2'-dimethyl-4,4'-diamino diphenylamine. Amino derivatives of aromatic ethers such as 2-amino diphenyl ether, 2-amino-4-acetyl diphenyl ether, benzyl-2-amino phenyl ether, 4-chloro-2-amino diphenyl ether, 4-amino-2-chloro diphenyl ether, 4-amino-4'-chloro diphenyl ether, 4,4'-dichloro-2-amino diphenyl ether, 2,2'-5'-trichloro-4-amino diphenyl ether. Mono acyl derivatives of diamines such as N-hexa hydro benzoyl p-phenylene diamine, N-hexahydro benzoyl p-toluylene diamine, N-benzoyl p-phenylene diamine, 2-benzoylamino-4-amino anisole, 2-hexahydro-benzoylamino-5-amino anisole, 2-amino-5-benzoylamino hydroquinone dimethyl ether and diethyl ether, 2-amino-5-furoyl amino hydroquinone dimethyl ether and diethyl ether and corresponding derivatives having instead of the furoyl group the radical of thiophene carboxylic acids. 2-amino-5-hexahydrobenzoylamino hydroquinone dimethyl ether and diethyl ether, 2-amino-5-phenoxyacetylamino hydroquinone diethyl ether, the monobenzyl and monophenyl urethane of 2,5-diamino hydroquinone dimethyl and diethyl ether, 1-amino-3-benzoylamino-4,6-dimethoxy benzene; analogous monoaroyl derivatives of 2,5-diamino-4-alkoxy toluenes and of 2,5-diamino-4-alkoxy chlorobenzenes and of 2,5-diamino-4-alkoxy benzene sulpho dialkylamides; analogous monoaroyl derivatives of 1,3-diamino-4-6-dimethyl benzenes; the diethyl amide of 2-amino-4-(4'-chlorophenoxy)-benzoic acid. Mono acyl derivatives of diamino p-chloro phenyl ethers such as, e. g., 2-amino-4-chloro-5-acetylamino diphenyl ether, 2-benzoylamino-4-chloro-5-amino anisole. Amino derivatives of aromatic sulphones such as, e. g., 3-amino-4-methyl diphenyl sulphone 2-amino-4'-methyl diphenyl sulphone, 2-amino-4-acetyl diphenyl sulphone, the ethyl ester of 3-amino-4-(p-toluene sulphonyl) benzoic acid, (4-methoxy-3-aminophenyl)-benzyl sulphone, 4-ethoxy-3-amino diphenyl sulphone. Amino azo compounds such as, e. g., 3,2'-dimethyl-4-amino azo benzene, 2-methyl-4-amino-5-methoxy-4'-chloro azo benzene, 4-amino-4'-nitro-3-methoxy-6-methyl azo benzene, 4-amino-4'-nitro-2,5-dimethoxy azo benzene, 4-amino-4'-chloro-3-methoxy-6-methyl azo benzene, the azo dye; diazotized o-anisidine coupled on alpha naphthylamine, 2,5-dimethoxy-4-amino-2'-ethyl carboxy-4'-nitro azo benzene, 2-acetylamino-4-amino-5-methoxy-2'-methyl sulfo-4'-nitro azo benzene. Amino derivatives of polynuclear ketones such as, e. g., 2,5-dibenzoyl aniline. Amino diphenyl methanes such as, e. g., 2-benzyl-4-chloroaniline. Amino derivatives of aryl esters of aromatic sulphonic acids such as, e. g., 2-amino-benzene sulphonic acid phenyl ester, 2-amino-4-chlorobenzene sulphonic acid p-cresyl ester. Amino xanthones.

The condensation of the diazotized amines with the cyclic guanidyl sulphonic acids is carried out in alkaline medium. The optimum pH, however, will vary to some extent with the particular diazo component and with the particular guanidine derivatives used. In general there will be an optimum pH or pH range for each pair of reaction components. In many cases an excess of the guanidine compounds is of advantage and it is possible to use an excess without a reagent waste since it can be recovered in most of the cases if desired.

Also the concentration and the temperature at which the reaction is advantageously carried out will vary with the reaction components used. However, in general it is advisable to maintain a low temperature and a low concentration.

The stabilized diazo compounds of the present invention contain a solubilizing sulphonic group and therefore most of them are soluble in aqueous alkali or in aqueous solutions of ammonia, of amines or of quaternary ammonium bases. In the case of alkali and of the strong quaternary ammonium bases, such as tetraethanol ammonium hydroxide, only an equivalent amount or a slight excess of the base is required to promote solution, while in the case of the weaker bases such as ammonia and the various amines a larger excess is required. Many stabilized diazo compounds of the present invention are also soluble in some polar organic solvents such as alcohols or acetone, particularly when such solvents contain some water.

The isolation of the stabilized diazo compounds of this invention may be effected by salting out and subsequent filtration or subsequent extraction with an organic solvent such as acetone. Through the addition of acids internal salts may be precipitated, however the compounds are not very stable to acids and the use of weak acids may even cause some decomposition.

The compounds are for the most part yellow to brown in color. They are very stable even at elevated temperatures and are not explosive which is an important and unpredictable property since many diazo compounds present considerable explosion hazard. The good solubility in aqueous solution of bases as pointed out above is another important property and constitutes an advantage of the present invention. Another advantage of the compounds of the present invention is the stability against alkaline hydrolysis and which prevents the compounds from coupling in alkaline solution.

The compounds of the present invention are split by acids in aqueous solution and regenerate the component parts of the molecules. The ease with which the compounds are split by acid will, of course, differ with different compounds, but in most cases heating with acetic acid is sufficient to effect splitting. From the practical point of view, it is important that in this manner an ice color component can be converted into a very stable diazo compound from which, however, the diazotized amine may be easily regenerated by the aid of acids.

Because of these desirable properties the stabilized diazo compounds of the present invention can be used mixed with ice color coupling components in alkaline printing pastes and the prints can be developed with steam containing vapors of weak acids such as formic or acetic acids. When the diazo compounds of the present invention are used in the form of salts with weak and volatile amines or are dissolved by the aid of weak and volatile amines such as, e. g., diethyl ethanolamine, the development of the color may be accomplished by steam only without any additional acid because the steam removes the amine and decreases the akalinity of the printing paste. This is also true if there is added to the printing paste a potential acidic substance which will produce an acid on steaming, such as, e. g., sodium monochloroacetate, the monoacetyl ester of glycerine, ethylene monochlorohydrin, formamide, etc.

Furthermore, in making up the printing paste, if insufficient amounts of base are used and some of the stabilized diazo compound and the coupling component remains undissolved, the prints may be developed with steam alone, without any addition of acid or of a potential acidic substance.

The invention will be described in conjunction with the following specific examples which are merely illustrative and are not intended to limit the scope of the invention. The parts are by weight.

Example 1

15.7 parts of o-dianisidine dihydrochloride are stirred with 50 parts of water for 30 minutes, and then 59.5 parts of hydrochloric acid (1.19) are added, and the stirring is continued for 30 minutes. The temperature is then lowered to 0° C. by the addition of ice and the diamine is tetrazotized by the addition of 25 parts of a 35% solution of sodium nitrite. This addition requires one hour, and the temperature is kept below 10° C. by the addition of ice. The tetrazo solution is filtered before use.

23.65 parts of guanyl suphanilic acid are added to the tetrazo solution so prepared and then 169.6 parts of 5N sodium hydroxide solution are added. The solution is stirred at 15° C. to 20° C. for 15 hours when the reaction is complete as shown by a negative diazo test on spotting with alkaline R salt. The solution is filtered and the temperature of the filtrate is lowered to 10° C. 30 parts of sodium chloride per 100 parts of solution are added and the precipitated material is filtered, pressed, and dried at 25° C. under vacuum. After grinding the product shows a brown color and is soluble in water.

When the product thus obtained is mixed with a slight excess over the equivalent quantity of 2-hydroxy-3-naphthoic acid o-toluidide and printed on cotton cloth, and the print developed in steam containing acetic acid vapors, a blue print is obtained.

Example 2

10.1 parts of o-tolidine are stirred with 50 parts of water for 30 minutes and then 59.5 parts of hydrochloric acid (1.19) are added and the stirring is continued 30 minutes. The temperature is lowered to 0° C. and the diamine is tetrazotized by the addition of 22 parts of 35% of sodium nitrite solution in about one hour. Ice is added as necessary to keep the temperature below 10° C. The tetrazo solution is filtered before use.

23.65 parts of guanyl sulphanilic acid are added to the above tetrazo solution, cooled to 10° C. and then 145.7 parts of 5N sodium hydroxide solution are added. The solution is stirred 15 hours at 15 to 20° C. and the reaction is complete as shown by a negative diazo test with alkaline R salt. The temperature is lowered to 10° C. and 30 parts of sodium chloride per 100 parts of solution are added. The precipitated material is filtered, pressed, and dried at 25° C. in a vacuum. After grinding the product shows a red brown color and is readily soluble in water.

When the product so obtained is mixed with a slight excess over the equivalent quantity of 2-hydroxy-3-naphthoic acid anilide and printed on cotton cloth, and the print developed in steam containing acetic acid vapors, a blue print is obtained.

If an equivalent quantity of di-acetoacetyl o-tolidide is substituted for the 2-hydroxy-3-naphthoic acid anilide, a reddish yellow print is obtained.

Example 3

9.2 parts of benzidine are stirred with 50 parts of water for 30 minutes and then 29.5 parts of hydrochloric acid (1.19) are added and the stirring is continued 30 minutes. The temperature is lowered to 0° C. by the addition of ice. The diamine is then tetrazotized by the addition of 7.5 parts of sodium nitrite dissolved in 30 parts of water. This addition requires 30 minutes. The filtered tetrazo solution is cooled to 10° C. and 30 parts of guanyl Tobias acid (2-guanidyl-naphthalene-1-sulphonic acid) are added. Then 148 parts of 5N potassium hydroxide solution are added and the reaction mixture is stirred for 15 hours at which time the reaction is complete as shown by a negative test on spotting with alkaline R salt. The precipitated material is filtered off and dried at 25° C. under vacuum. After grinding, the product showed a brown color.

When the product so obtained is blended with a slight excess over the equivalent quantity of 2-hydroxy-3-naphthoic acid o-phenetidide and printed on cotton cloth in the usual manner, a reddish violet print is obtained.

Example 4

42.2 parts of 3,3'-dichlorobenzidine dihydrochloride (38.6% real base) are carefully pasted with 50 parts of water. 59.5 parts of hydrochloric acid (1.19) are added and the slurry is stirred for 30 minutes. The temperature is then lowered to 0° C. and the diamine is tetrazotized with 8.75 parts of sodium nitrite dissolved in 35 parts of water. The tetrazotization required about 15 minutes. 42.2 parts of guanidyl benzene-2,5-disulphonic acid are added to the filtered tetrazo solution and the temperature is lowered to 10° C. Then 210 parts of 5N potassium hydroxide solution are added. The reaction is complete after 30 minutes as shown by a negative test on spotting with alkaline R salt. 33 parts of potassium carbonate per 100 parts of solution are added and the solution is cooled to 5° C. and stirred 15 minutes. The precipitated material is filtered, pressed and dried at 25° C. under vacuum. After grinding it shows a red-brown color, and is readily soluble in water.

When the product so obtained is blended with a slight excess over the equivalent quantity of 2-hydroxy-3-naphthoic acid anilide and printed on cotton cloth in the usual manner, a reddish violet print is obtained.

What we claim is:

1. Stabilized diazo compounds having the following general formula: X—(N=N—G)$_n$ in which X is a radical of a polynuclear ice color diazo component, G is a radical included in the group consisting of cyclic guanidyl sulphonic acid radicals free from carboxylic groups and free from azoic coupling groups, and their alkali metal and ammonium salts, and $n$ is a whole number included in the group consisting of 1 and 2.

2. Stabilized diazo compounds having the following general formula: X—N=N—G in which X is a radical of a polynuclear ice color diazo component, G is a radical included in the group consisting of cyclic guanidyl sulphonic acid radicals free from carboxylic groups and free from azoic coupling groups, and their alkali metal and ammonium salts.

3. Stabilized diazo compounds having the following general formula: X—(N=N—G)$_2$ in which X is a radical of a polynuclear ice color diazo component, G is a radical included in the group consisting of cyclic guanidyl sulphonic acid radicals free from carboxylic groups and free from azoic coupling groups, and their alkali metal and ammonium salts.

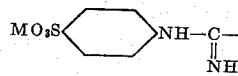 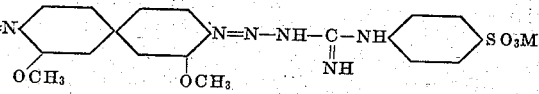

4. Stabilized diazo compounds having the following general formula: X—(N=N—G)$_2$ in which X is a radical of the biphenyl group and G is a radical included in the group consisting of cyclic guanidyl sulphonic acid radicals free from carboxylic groups and free from azoic coupling groups, and their alkali metal and ammonium salts.

5. Stabilized diazo compounds having the following general formula: X—(N=N—G)$_2$ in which X is a radical of the biphenyl group and G is a radical included in the group consisting of the 4-guanidyl benzene sulphonic acid radical and its alkali metal and ammonium salts.

6. Stabilized diazo compounds having the following general formula:

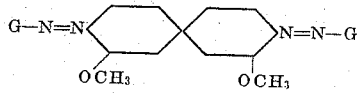

in which G is a radical included in the group consisting of cyclic guanidyl sulphonic acid radicals free from carboxylic groups and free from azoic coupling groups, and their alkali metal and ammonium salts.

7. A stabilized diazo compound having the following formula:

in which M represents a member of the group consisting of hydrogen, alkali metals or ammonium radicals.

8. A process of producing stabilized diazo compounds which comprises reacting diazotized polynuclear ice color components with cyclic guanidyl sulphonic acids free from carboxylic groups and free from azoic coupling groups, in alkaline medium.

9. A process of producing stabilized diazo compounds which comprises reacting tetrazo compounds belong to the biphenyl group with cyclic guanidyl sulphonic acids free from carboxylic groups and free from azoic coupling groups, in alkaline medium.

10. A process for producing a stabilized diazo compound which comprises reacting tetrazotized o-dianisidine with guanyl sulphanilic acid in alkaline medium.

HANS Z. LECHER.
FREDERIC H. ADAMS.
HENRY PHILIP OREM.

DISCLAIMER 2,200,926.—*Hans Z. Lecher*, Plainfield, *Frederic H. Adams*, Somerville, and *Henry Philip Orem*, North Plainfield, N. J. DIAZO DERIVATIVES OF CYCLIC GUANIDYL SULPHONIC ACIDS. Patent dated May 14, 1940. Disclaimer filed June 17, 1942, by the assignee, *American Cyanamid Company*.

Hereby disclaims claims 1, 2, 3, 4, 6, 8, and 9.

[*Official Gazette July 21, 1942.*]